United States Patent [19]
Kokubo

[11] Patent Number: 5,927,382
[45] Date of Patent: Jul. 27, 1999

[54] AIR CONDITIONING APPARATUS FOR VEHICLE

[75] Inventor: Yoshinobu Kokubo, Kariya, Japan

[73] Assignee: Denso Corporation, Kariya, Japan

[21] Appl. No.: 08/927,760

[22] Filed: Sep. 11, 1997

[30] Foreign Application Priority Data

Sep. 26, 1996 [JP] Japan ................................. 8-254938

[51] Int. Cl.$^6$ ............................. B60H 3/00; B60R 21/02
[52] U.S. Cl. ............................................. 165/42; 280/748
[58] Field of Search .................................. 165/41, 42, 43;
280/748, 751, 752

[56] References Cited

U.S. PATENT DOCUMENTS

| | | | |
|---|---|---|---|
| 5,106,018 | 4/1992 | Loup | 237/12.3 B |
| 5,222,372 | 6/1993 | DeRees | 62/244 |
| 5,305,823 | 4/1994 | Elliot | 165/41 |
| 5,335,718 | 8/1994 | Smith | 165/42 |
| 5,687,790 | 11/1997 | Trame | 165/42 |
| 5,755,107 | 5/1998 | Shiroto et al. | 62/244 |

FOREIGN PATENT DOCUMENTS

| | | |
|---|---|---|
| Y2-50-8368 | 3/1975 | Japan . |
| Y2-63-44252 | 11/1988 | Japan . |

*Primary Examiner*—Ira S. Lazarus
*Assistant Examiner*—Lance Chandler
*Attorney, Agent, or Firm*—Harness, Dickey & Pierce, PLC

[57] ABSTRACT

An evaporator for cooling air is disposed within resinous cases obliquely relative to a vehicle front-rear direction. The evaporator rotates to a vehicle front side when a shock is applied to the cases from a vehicle rear side at a time of a vehicle collision. Therefore, even if a passenger in a passenger compartment collides with the cases at the vehicle collision, the evaporator rotates toward the vehicle front side to decrease the shock to the passenger's body, thereby protecting the passenger.

18 Claims, 3 Drawing Sheets

AIR CONDITIONING APPARATUS FOR VEHICLE

CROSS-REFERENCE TO RELATED APPLICATION

This application is related to and claims priority from Japanese Patent Application No. 8-254938 filed on Sep. 26, 1996, the contents of which are hereby incorporated by reference.

BACKGROUND OF THE INVENTION

1. Field of the Invention

The present invention relates to an air conditioning apparatus for a vehicle, and particularly, to a cooling unit for the air conditioning apparatus, which is disposed at a lower side of an instrument panel in a passenger compartment and which can be rotated toward a vehicle front side when a vehicle collides to protect a passenger in the passenger compartment.

2. Description of Related Art

Conventionally, as shown in FIG. 5, a cooling unit for an air conditioning apparatus includes resinous cases 1 and 2 divided into upper and lower two parts, and an evaporator 3 contained therein. The cases 1 and 2 are formed in a shape along an outer shape of the evaporator 3 to hold and fix the evaporator 3 therein. The cooling unit is disposed at a passenger's seat side next to a driver's seat under an instrument panel in a passenger compartment.

Further, in another type conventional cooling unit shown in FIG. 6, a sponge-like elastic member 4 is provided between an evaporator 3 and inner surfaces of resinous cases 1 and 2, and the evaporator 3 is held in the cases 1 and 2 while elastically compressing the elastic member 4 so that the evaporator is fixed within the cases 1 and 2 by an elastic force of the elastic member 4. Generally, a thickness of the elastic member 4 is approximately several millimeters.

In each of the conventional cooling units shown in FIGS. 5 and 6, a longitudinal direction of the evaporator 3 is in the vehicle front-rear direction to effectively use a space at a lower side of the instrument panel in the passenger compartment.

However, in the cooling unit shown in FIG. 5, because the outer peripheral portion of the evaporator 3 is entirely held and fixed by the cases 1 and 2, the cooling unit is a complete rigid body. As a result, when a vehicle collides, a passenger seated on the passenger's seat next to the driver's seat is moved toward a vehicle front side, and the passenger's body such as the knee may collide with the cooling unit so that a large shock may be given to the passenger's body. At this time, since the longitudinal direction of the evaporator 3 is in the vehicle front-rear direction, the above-described problem may be further facilitated.

Because a space for rotating the evaporator 3 within the cases 1 and 2 is extremely small, the evaporator 3 does not rotate within the cases 1 and 2 even if a passenger collides with the cooling unit obliquely relative to the evaporator 3. As a result, a large shock may be given to the passenger's body at a time of a vehicle collision.

In the cooling unit shown in FIG. 6, since the thickness of the elastic member 4 is extremely small to be several millimeters, the cooling unit becomes in a state similar to a rigid body when a passenger collides with the cooling unit at a time of a vehicle collision. Thus, when the vehicle collides, a large shock may be also given to the passenger's body. Further, because the evaporator 3 is fixed in the cases 1 and 2 by the elastic force of the elastic member 4, the evaporator 3 can be moved slightly in the cases 1 and 2. As a result, a position of a refrigerant pipe of the evaporator 3 is shifted, and the assembling performance of the cooling unit is deteriorated when being installed in a vehicle.

SUMMARY OF THE INVENTION

In view of the foregoing problems, it is an object of the present invention to provide an air conditioning apparatus which has a safe structure to protect a passenger in a passenger compartment when a vehicle collides.

It is an another object of the present invention to provide an air conditioning apparatus which is readily assembled into a vehicle.

According to present invention, a heat exchanger is disposed in a case in such a manner that the heat exchanger moves toward a vehicle front side when a shock is applied to the case from a vehicle rear side at a time of a vehicle collision. Thus, even if a passenger in a passenger compartment collides with the case at a time of a vehicle collision, the evaporator moves toward the vehicle front side to decrease the shock to the passenger's body, thereby protecting the passenger in the passenger compartment.

Preferably, the heat exchanger is disposed in the case obliquely relative to a vehicle front-rear direction to have a slanted angle. Further, the heat exchanger rotates to the vehicle front side when the vehicle collides. Thus, when the vehicle collides, the heat exchanger readily rotates to the vehicle front side to protect a passenger in the passenger compartment.

More preferably, a groove portion is formed on a surface of the case at a vehicle rear side, and the groove portion is broken when a load more than a predetermined value is applied to the surface of the case at the vehicle rear side. Therefore, even if the case is made of a material having a high strength, the case is readily broken when the vehicle collides.

Further, an elastic member is disposed between the heat exchanger and an inner surface of the case, and the heat exchanger is held in the case by an elastic force of the elastic member. Therefore, the heat exchanger readily slides on the case to readily rotate the heat exchanger when the vehicle collides.

Further, a supporting member is formed on an inner surface of the case to set a position of the heat exchanger in a vehicle right-left direction, and the supporting member is broken when a load more than a predetermined value is applied to the supporting member by the heat exchanger. Thus, when the heat exchanger is installed in a vehicle, pipes can be readily accurately connected to the heat exchanger so that the assembling performance of the air conditioning apparatus is improved.

Preferably, the case forms a space for rotating the heat exchanger to the vehicle front side. Therefore, the heat exchanger readily rotates.

Further, a bending portion is formed in a heat exchanging medium pipe at a position where the pipe protrudes from the case, to bend the pipe in a rotational direction of the heat exchanger when the heat exchanger rotates at a time of a vehicle collision. Thus, the rotation of the heat exchanger is not interrupted by the pipe when the vehicle collides.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
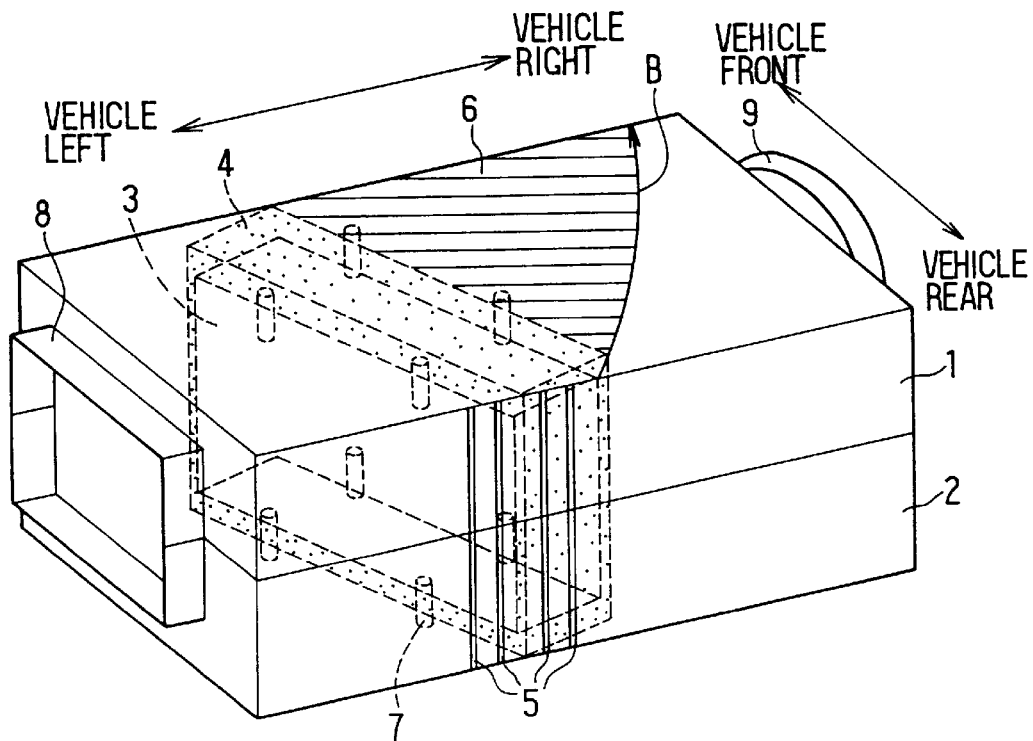
FIG. 1 is a schematic perspective view showing a cooling unit for an air conditioning apparatus according to a first preferred embodiment of the present invention.
Figure 2:
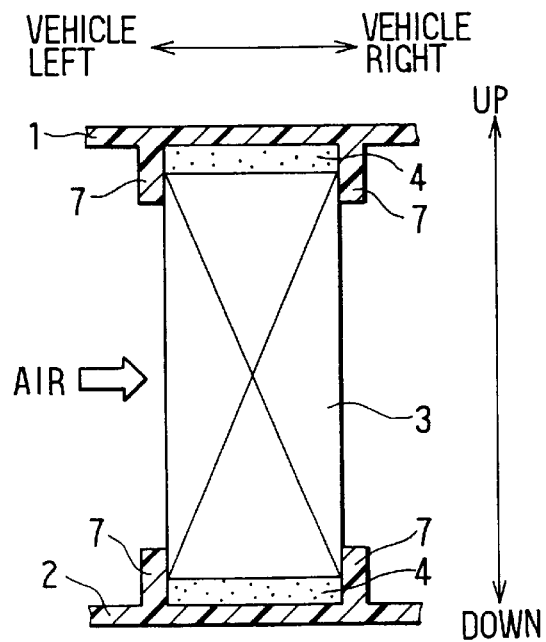
FIG. 2 is a longitudinal sectional view of the cooling unit in FIG. 1.

The first preferred embodiment of the present invention will be described with reference to FIGS. 1 through 3.

A cooling unit for an air conditioning apparatus for a vehicle is provided in a passenger compartment of the vehicle having a right-side steering wheel. The cooling unit is disposed at a front side of a passenger's seat next to the driver's seat, under an instrument panel in the passenger compartment. As shown in FIG. 1, the cooling unit includes both cases 1 and 2 divided into two parts in the up-down direction in the passenger compartment. The cases 1 and 2 are each made of a resinous material such as polypropylene, having an elasticity and a sufficient strength.

The resinous cases 1 and 2 are formed in a box shape, and are separably connected by fastening means such as a spring clip (not shown) made of a metal. An evaporator 3 is contained and fixed within the cases 1 and 2, and the cases 1 and 2 form an air passage therein.

The evaporator 3 evaporates gas-liquid two phase refrigerant decompressed in an expansion valve (not shown), by absorbing heat from air. Therefore, air is cooled while passing through the evaporator 3. The evaporator 3 has a thin thickness in the vehicle left-right direction, and a longitudinal direction thereof is placed in the vehicle front-rear direction. The evaporator 3 is formed approximately in a rectangular parallelopiped shape.

The evaporator 3 has a well-known structure. For example, two thin plates made of metal are connected to form a tube (not shown), and a plurality of the tubes are laminated to each other through corrugated fins. Refrigerant flowing through the plurality of tubes is heat-exchanged with air flowing between the tube and the corrugated fin to cool the air.

The evaporator 3 is disposed obliquely relative to the vehicle front-rear direction. An end surface 3a of the evaporator 3, at the vehicle rear side (i.e., the passenger side), is opposed to the vehicle right side (i.e., the driver's seat side). A suitable slanted angle θ (reference to FIG. 3) of the evaporator 3 relative to the vehicle front-rear direction is approximately 30° to improve a cooling performance of the evaporator 3 while readily rotating the evaporator 3 at a time of a vehicle collision.

A plurality of grooves 5 (e.g., four grooves in the first embodiment) are formed on surfaces of the cases 1 and 2, at the vehicle rear side (i.e., the passenger side), to break the cases 1 and 2 when a passenger's body such as the knee collides with the cooling unit so that a load more than a predetermined load is applied to the cooling unit at a time of a vehicle collision. As shown in FIG. 3, each of the groove portions 5 is formed in a trapezoid shape in cross-section, and the bottom portion thereof has a thin thickness (e.g., 0.5 mm) which is thinner than each thickness (e.g., 1.5 mm) of the cases 1 and 2.

Figure 3:
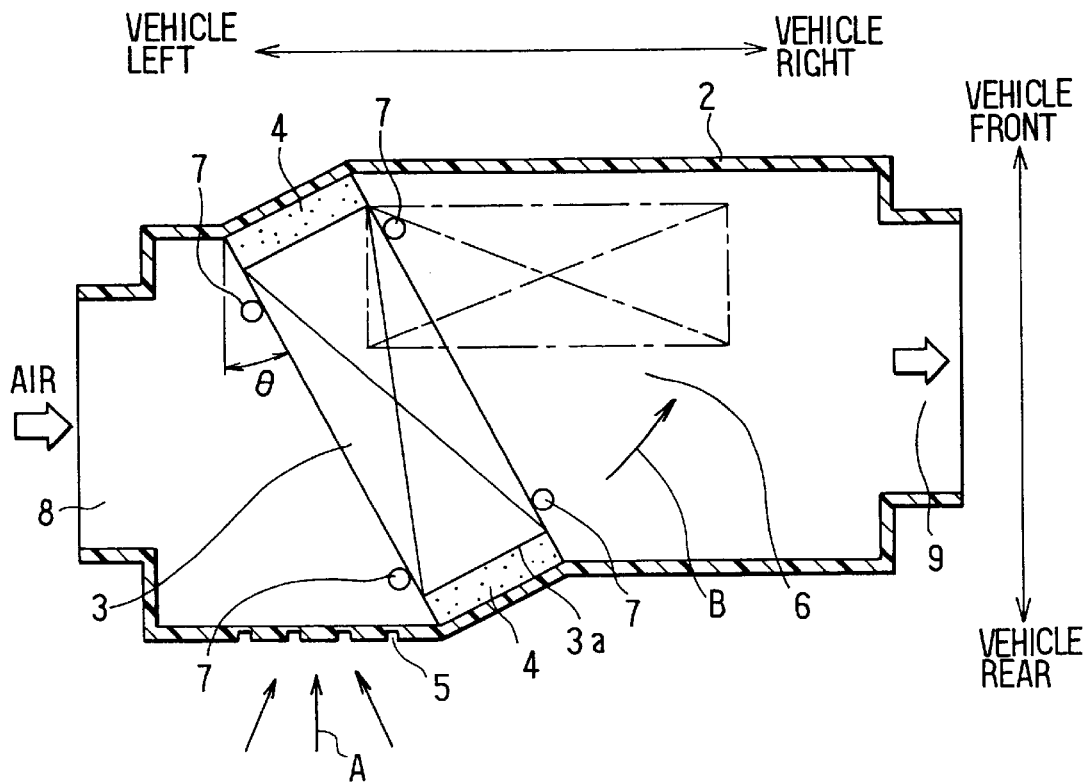
FIG. 3 is a transverse sectional view of the cooling unit in FIG. 1.

As shown in FIG. 3, the groove portions 5 are formed at a left side relative to the end surface 3a of the evaporator 3 at the vehicle rear side (i.e., the passenger side), and the evaporator 3 is slanted to the vehicle right side. When an external force is applied to the cooling unit from the vehicle rear side (i.e., the passenger side) shown by an arrow "A" at a time of a vehicle collision, the evaporator 3 rotates in the vehicle front side direction (i.e., counterclockwise direction) as shown by an arrow "B" in FIG. 3. Because the groove portions 5 are formed on the case at the left side relative to the end portion 3a of the evaporator 3 at the vehicle rear side, the evaporator 3 readily rotates in the arrow "B" direction by breaking the cases 1 and 2 proximate to the groove portions 5.

That is, the positions of the groove portions 5 are set to be opposite to the rotational direction "B" of the evaporator 3 relative to the preset slanted evaporator 3. An interval between each adjacent groove portions 5 is in a range of 10–15 mm, for example.

Further, any other part for the air conditioning apparatus is not disposed in a right side space of the evaporator 3 to provide the space 6 for rotating the evaporator 3. Therefore, the evaporator 3 smoothly rotates in the arrow "B" direction (i.e., counterclockwise direction) when a vehicle collides.

An elastic member 4 which can be elastically deformed is bonded on upper and lower end surfaces (see FIG. 2) and the front and rear end surfaces (see FIG. 3) of the evaporator 3. The elastic member 4 is formed in a sponge like and has approximately several millimeters thickness when not being compressed. For example, the elastic member 4 is made of a porous elastic material such as polyurethane foam. The elastic member 4 is elastically compressed between the evaporator 3 and the cases 1 and 2, the upper and lower positions and the right and left positions of the evaporator 3 are set by an elastic force of the elastic member 4. Since the elastic member 4 is made of a sponge-like porous elastic material having a low heat conductivity, heat-transmission can be interrupted by the elastic member 4.

A plurality of cylindrical pins (i.e., supporting member) 7 made of resin are respectively formed on an upper inner surface of the case 1 and a lower inner surface of the case 2 along the slanted position of the evaporator 3.

By the pins 7, the position of the evaporator 3 in the right-left direction is set when the evaporator 3 is fixed in the cases 1 and 2. Further, when the evaporator 3 rotates in the arrow "B" direction (i.e., the counterclockwise direction) at a time of a vehicle collision so that a load more than a predetermined value is applied to the pins 7, the pins 7 are broken to rotate the evaporator 3. For example, the diameter of each cylindrical pin 7 is 4 mm, and the height thereof is 20 mm.

Air blown from a blower unit (not shown) flows into the evaporator 3 through an air inlet 8, and air cooled in the evaporator 3 flows outside through an air outlet 9. The air outlet 9 is connected to an inlet of a heating unit (not shown).

According to the first embodiment, the evaporator 3 is fixed within the cases 1 and 2 by the elastic force of the elastic member 4, and the position of the evaporator 7 can be accurately set by the pins 7 formed on the inner surfaces of the cases 1 and 2. Thus, when the cooling unit is installed in a vehicle, refrigerant pipes of the evaporator 3 can be readily accurately disposed so that the assembling performance of the evaporator 3 in the vehicle can be improved.

At the vehicle collision, the knee of a passenger seated on the passenger's seat next to the driver's seat collides with the cases 1 and 2 in the arrow "A" direction in FIG. 3. In the first embodiment, because the groove portions 5 are formed on the cases 1 and 2 at the left side relative to the end surface 3a of the evaporator 3 at the vehicle rear side, the cases 1 and 2 are readily broken by the groove portions 5. Further, because the space 6 for rotating the evaporator 3 are provided within the cases 1 and 2 at the right side of the evaporator 3, the evaporator 3 can rotate in the arrow "B" direction in FIG. 3 when the groove portion 5 is broken at a time of a vehicle collision so that a shock is applied to the evaporator 3.

When a load more than a predetermined value is applied to the pins 7 by a rotational force of the evaporator 3, the pins 7 are broken to rotate the evaporator 3 to the chain line position in FIG. 3. Thus, when a passenger seated on a passenger's seat next to the driver's seat collides with the cooling unit at a time of a vehicle collision, it can prevent a large shock from being given to the passenger's body beforehand.

Further, by the elastic member 4, the evaporator 3 readily slides between the cases 1 and 2 at a time of a vehicle collision to suppress the evaporator 3 from being embedded into the broken portion of the cases 1 and 2. Therefore, the evaporator 3 readily rotates by the elastic member 4.

A second preferred embodiment of the present invention will be described with reference to FIG. 4.

Figure 4:
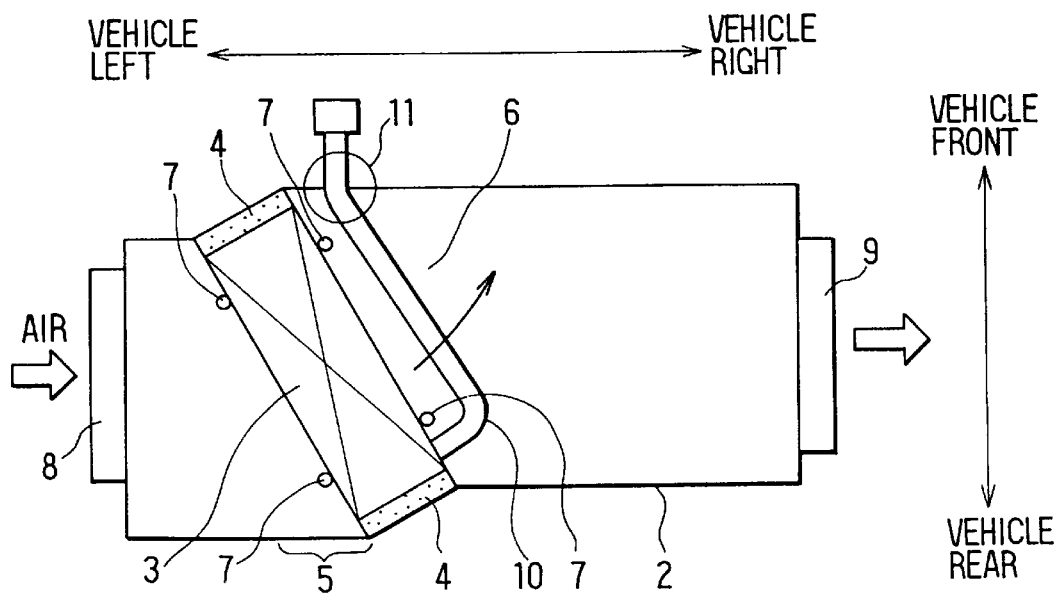
FIG. 4 is a transverse sectional view showing a cooling unit for an air conditioning apparatus according to a second preferred embodiment of the present invention.
Figure 5:
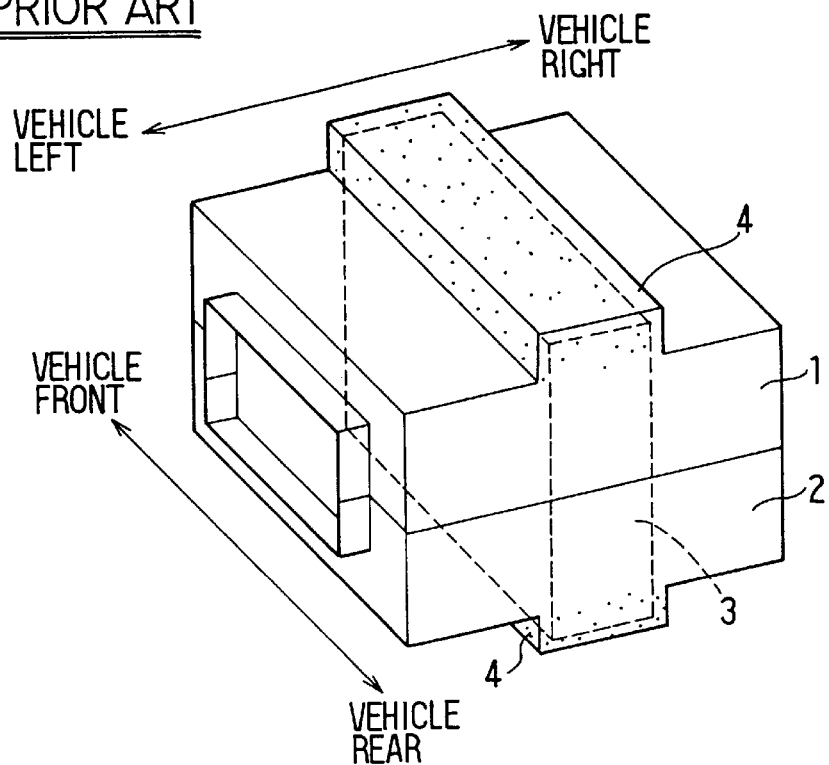
FIG. 5 is a schematic perspective view showing a conventional cooling unit.
Figure 6:
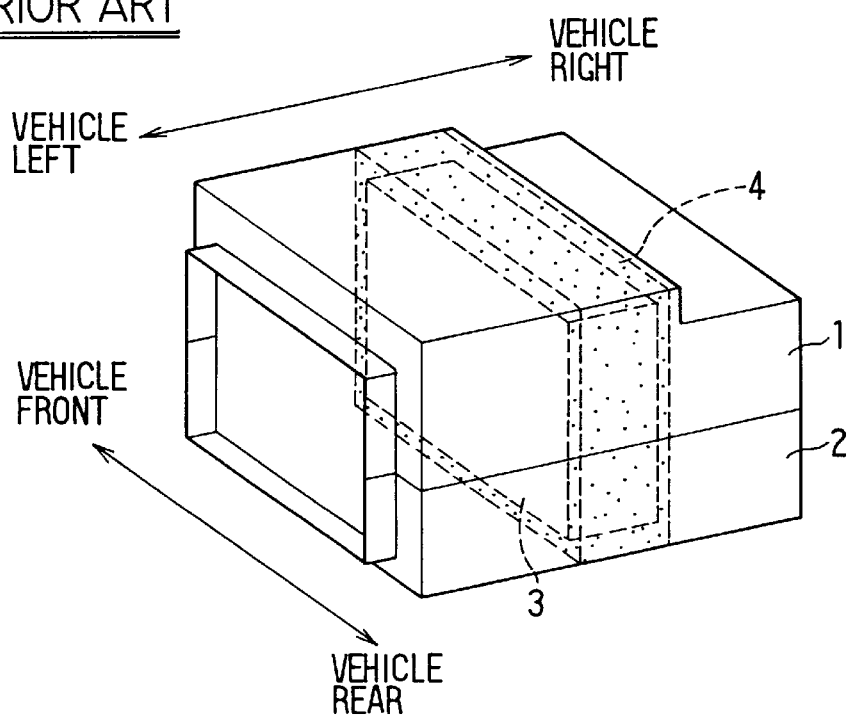
FIG. 6 is a schematic perspective view showing an another conventional cooling unit.

As shown FIG. 4, by a refrigerant pipe 10 for circulating refrigerant in the evaporator 3, the rotation of the evaporator 3 may be interrupted. In this case, a bending portion 11 is formed in the refrigerant pipe 10 at a position where the refrigerant pipe 10 protrudes from the cases 1 and 2. The refrigerant pipe 10 is bent in the rotational direction of the evaporator 3 to readily bend the refrigerant pipe 10 when the evaporator 3 rotates at a time of a vehicle collision. By forming the bending portion 11 in the refrigerant pipe 10, the refrigerant pipe 10 is readily bent with the rotation of the evaporator 3 when the vehicle collides.

Although the present invention has been fully described in connection with preferred embodiments thereof with reference to the accompanying drawings, it is to be noted that various changes and modifications will become apparent to those skilled in the art.

For example, in the above-described embodiments, the groove portions 5 are formed on the cases 1 and 2 to readily broken the cases 1 and 2 when a vehicle collides. However, by changing the material and the shape of the cases 1 and 2, the cases 1 and 2 may be broken when a load more than a predetermined value is applied to the cases 1 and 2 at a time of a vehicle collision. Here, the groove portions 5 may be not provided on the cases 1 and 2.

Conversely, to readily break the cases 1 and 2 at a time of a vehicle collision, the other groove portions may be further formed on the upper surface of the case 1 and the lower surface of the case 2, proximate to the groove portions 5.

Further, in the above-described embodiments, the cooling unit for an air conditioning apparatus is applied to a vehicle having a right-side steering wheel. However, it may be applied to a vehicle having a left-side steering wheel. In the vehicle having the left steering wheel, the cooling unit is disposed in the vehicle at the right side, the slanted direction of the evaporator 3 is opposite to that in FIG. 3, and the evaporator 3 rotates in clockwise direction (i.e., a direction opposite to the arrow "B" direction) when the vehicle collides.

Further, in the above-described embodiments, the evaporator 3 for evaporating refrigerant by absorbing heat from air is used as the cooling unit for an air conditioning apparatus. However, the present invention may be applied in a brine type cooling unit in which water (brine) is cooled by the evaporator 3 and the cooled water (brine) circulates.

Such changes and modifications are to be understood as being within the scope of the present invention as defined by the appended claims.

What is claimed is:

1. An air conditioning apparatus for a vehicle having an instrument panel in a passenger compartment, said air conditioning apparatus being disposed at a lower side of said instrument panel, comprising:

a heat exchanger for performing heat-exchanging between air and a heat exchanging medium passing therethrough, said heat exchanger having a ventilation surface extending in a vehicle front-rear direction, and having a rear side end in the vehicle front-rear direction;

a case for containing and fixing said heat exchanger therein, wherein said heat exchanger is disposed in said case in such a manner that said rear side end of said heat exchanger rotates toward a vehicle front side to form a predetermined space between said rear side end of said heat exchanger and a rear side inner wall or said case after the rotation when a shock is applied to said case from a vehicle rear side at a time of a vehicle collision.

2. An air conditioning apparatus according to claim 1, wherein said heat exchanger is disposed in said case obliquely relative to a vehicle front-rear direction to have a slanted angle.

3. An air conditioning apparatus according to claim 2, wherein said slanted angle is approximately 30°.

4. An air conditioning apparatus according to claim 1, wherein said heat exchanger is an evaporator for cooling air.

5. An air conditioning apparatus according to claim 1, wherein, said case including a groove portion having a thickness thinner than that of said case, formed on a surface thereof at said vehicle rear side, and said groove portion is broken when a load more than a predetermined value is applied to said surface of said case at said vehicle rear side.

6. An air conditioning apparatus according to claim 1, further comprising:

an elastic member disposed between said heat exchanger and an inner surface of said case, wherein said heat exchanger is held in said case by an elastic force of said elastic member.

7. An air conditioning apparatus according to claim 1, further comprising:

a supporting member formed on an inner surface of said case to set a position of said heat exchanger in a vehicle right-left direction, wherein said supporting member is broken when a load more than a predetermined value is applied to said supporting member by said heat exchanger.

8. An air conditioning apparatus according to claim 1, wherein said case forms a space for rotating said heat exchanger to said vehicle front side.

9. An air conditioning apparatus according to claim 1, further comprising:

a pipe for circulating a heat exchanging medium in said heat exchanger, said pipe having a bending portion formed at a position where said pipe protrudes from said case, to bend said pipe in a rotational direction of said heat exchanger when said heat exchanger rotates.

10. An air conditioning apparatus according to claim 1, wherein said case is made of resin.

11. An air conditioning apparatus according to claim 1, wherein:

said heat exchanger rotates around a rotation axis when said vehicle collides; and said rotation axis is a front side end of said heat exchanger in said vehicle front-rear direction.

12. An air conditioning apparatus according to claim 1, wherein said ventilation surface of said heat exchanger is approximately perpendicular to said vehicle front-rear direction after the rotation.

13. An air conditioning apparatus for a vehicle having an instrument panel in a passenger compartment, said air conditioning apparatus being disposed at a lower side of said instrument panel, comprising:

a heat exchanger for performing heat-exchanging between air and a heat exchanging medium passing therethrough, said heat exchanger having a ventilation surface extending in a vehicle front-rear direction, and having front and rear side ends in the vehicle front-rear direction; and a case for containing and fixing said heat exchanger therein, wherein said heat exchanger is disposed in said case in such a manner that said rear side end of said heat exchanger rotates around said front side and toward a vehicle front side, when a shock is applied to said case from a vehicle rear side at a time of a vehicle collision.

14. An air conditioning apparatus according to claim 13, wherein said ventilation surface of said heat exchanger is approximately perpendicular to said vehicle front-rear direction after the rotation.

15. An air conditioning apparatus for a vehicle having an instrument panel in a passenger compartment, said air conditioning apparatus being disposed at a lower side of said instrument panel, said air conditioning apparatus comprising:

a heat exchanger for performing heat-exchanging between air flowing in a direction generally perpendicular to said front-rear direction of said vehicle and a heat exchanging medium passing therethrough, said heat exchanger being disposed in a first position at an acute angle with respect to said front-rear direction of said vehicle; and a case for containing and fixing said heat exchanger therein, wherein said heat exchanger is disposed in said case such that said heat exchanger rotates to a second position generally perpendicular to said front-rear direction when a shock is applied to said case from a vehicle rear side.

16. The air conditioning apparatus according to claim 15 wherein, said acute angle is approximately 30°.

17. The air conditioning apparatus according to claim 15 wherein, said case releasably secures said heat exchanger in said first position.

18. The air conditioning apparatus according to claim 15 wherein, said heat exchanger is disposed generally vertical.

* * * * *